United States Patent
Snels

(10) Patent No.: US 10,617,987 B2
(45) Date of Patent: Apr. 14, 2020

(54) OIL SEPARATOR

(71) Applicant: ATLAS COPCO AIRPOWER, NAAMLOZE VENNOOTSCHAP, Wilrijk (BE)

(72) Inventor: Guy L. A. Snels, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 318 days.

(21) Appl. No.: 15/521,821

(22) PCT Filed: Oct. 29, 2014

(86) PCT No.: PCT/BE2014/000058
§ 371 (c)(1),
(2) Date: Apr. 25, 2017

(87) PCT Pub. No.: WO2016/065431
PCT Pub. Date: May 6, 2016

(65) Prior Publication Data
US 2017/0259198 A1 Sep. 14, 2017

(30) Foreign Application Priority Data
Dec. 29, 2014 (BE) .................... 2014/5039

(51) Int. Cl.
B01D 45/12 (2006.01)
B01D 46/00 (2006.01)
(Continued)

(52) U.S. Cl.
CPC ..... *B01D 46/0031* (2013.01); *B01D 19/0057* (2013.01); *B01D 45/12* (2013.01);
(Continued)

(58) Field of Classification Search
CPC ............... B01D 19/0057; B01D 45/12; B01D 46/0031; B01D 50/002; F04C 18/16; F04C 29/026
See application file for complete search history.

(56) References Cited

U.S. PATENT DOCUMENTS 4,203,739 A * 5/1980 Erdmannsdorfer .................... B01D 46/0024
210/315
8,303,264 B2 11/2012 Daniels et al.
(Continued)

FOREIGN PATENT DOCUMENTS

BE 1011704 A3 12/1999
JP H08-189489 7/1996
(Continued)

OTHER PUBLICATIONS

International Search Report (ISR) dated Mar. 10, 2015, for PCT/BE2014/000058.
(Continued)

Primary Examiner — Cabrena Holecek
(74) Attorney, Agent, or Firm — Bacon & Thomas, PLLC

(57) ABSTRACT

An oil separator provided with a housing with an inlet for an oil-gas mixture and which defines a space that is closed off by means of a lid, whereby a screen is provided in the aforementioned space in which a filter element is affixed and a pipe or collector that connects the interior of the filter element to an outlet in the housing for purified gas, whereby the oil separator is provided with a drainage line for the removal of the oil that has been filtered out, wherein the drainage line ensures the removal of the oil that has been filtered out from the underside of the filter element directly to an outlet for oil in the housing.

17 Claims, 4 Drawing Sheets

(51) Int. Cl.
*B01D 50/00* (2006.01)
*F04C 29/02* (2006.01)
*B01D 19/00* (2006.01)
*F04C 18/16* (2006.01)

(52) U.S. Cl.
CPC .......... *B01D 50/002* (2013.01); *F04C 29/026* (2013.01); *F04C 18/16* (2013.01)

(56) References Cited

U.S. PATENT DOCUMENTS

| | | |
|---|---|---|
| 8,945,257 B2 | 2/2015 | Moens |
| 2006/0201871 A1 | 9/2006 | Gillenberg et al. |
| 2007/0240391 A1* | 10/2007 | Becker ............... B01D 46/0031 55/423 |

FOREIGN PATENT DOCUMENTS

| | | |
|---|---|---|
| JP | 2003120565 A | 4/2003 |
| WO | 2007/019651 A2 | 2/2007 |
| WO | 2010/124349 A1 | 11/2010 |

OTHER PUBLICATIONS

Chinese Office Action in related Chinese Application No. 201480084003.6, dated May 18, 2018.

* cited by examiner

OIL SEPARATOR

The present invention relates to an oil separator.

More specifically, the invention concerns an oil separator that is provided with a housing with an inlet for an oil-gas mixture and which defines a space that is closed off by means of a lid, whereby the aforementioned space is provided with a screen in which a filter element is affixed and a pipe or collector that connects the interior of the filter element to an outlet in the housing for purified gas, whereby the oil separator is provided with a drainage line for draining off the oil that has been filtered out.

BACKGROUND OF THE INVENTION

Such oil separators are already used in oil-injected compressors, whereby the oil-gas mixture from the outlet of the compressor element is guided to the oil separator before being guided, for example, to consumers of compressed gas.

In the oil separator, the oil-gas mixture to be treated is brought into the space between the screen and the housing via the inlet in the housing where the oil-gas mixture will flow so that a first separation phase takes place.

Then the oil-gas mixture will undergo a second separation phase when the liquid-gas mixture is forced to flow around the end of the screen to the space enclosed by the screen and to change direction in this way.

The separated oil will be collected in the housing of the oil separator at the bottom.

The oil-gas mixture will then flow through the filter element, whereby the oil-gas mixture will finally arrive in the interior of the filter element.

The filter element can consist of a casing that is provided with a suitable filter material that is closed off by the lid and the bottom.

When flowing through the filter element a third separation phase takes place, whereby the separated oil is collected in the bottom.

The thus purified gas is brought from the inside to the outlet in the housing via the pipe or collector, where it is guided to consumers of compressed gas.

The filter element of the oil separator can be replaced for maintenance or repair by removing the lid on the top of the oil separator.

It is known that the oil caught by the filter element that is collected in the bottom is drained off via a drainage line that runs from the bottom of the filter element, via the lid of the filter element to the lid of the oil separator. In the lid of the oil separator there is an opening for draining off the oil.

Such known installations present the disadvantage that when the filter element has to be replaced, the drainage line also has to be detached from the lid of the oil separator.

This means that the drainage line can be damaged and/or that when refitting the filter element and the lid of the oil separator, the drainage line is connected incorrectly.

SUMMARY OF THE INVENTION

The purpose of the present invention is to provide a solution to at least one of the aforementioned and other disadvantages.

The object of the present invention is an oil separator that is provided with a housing with an inlet for an oil-gas mixture and which defines a space that is closed off by means of a lid, whereby a screen is provided in the aforementioned space in which a filter element is affixed and a pipe or collector that connects the interior of the filter element to an outlet in the housing for purified gas, whereby the oil separator is provided with a drainage line that ensures the removal of the oil that has been filtered out from the underside of the filter element directly to an outlet for oil in the housing.

'Directly' here means that the drainage line does not pass via the interior of the filter element, but runs from the bottom to the sidewall of the housing. In other words: the drainage line is not, not even partially, in the interior of the filter element and/or thus does not pass via the interior of the filter element or through the lid of the housing.

An advantage is that the drainage line does not have to be removed when the filter element is replaced, serviced or repaired.

Indeed, the lid of the housing can be released and opened, after which the filter element can be removed, if need be after detaching the drainage line from the bottom.

In other words: the drainage line remains in the housing of the oil separator.

This has the advantage that the drainage line does not have to be fitted again each time when the filter element is taken out of the oil separator.

Preferably the lid of the housing can be removed independently of the filter element.

This has the advantage that the lid of the housing can be released, without the filter element being manipulated.

This can be realised for example by ensuring that the lid of the filter element is at a distance from the lid of the housing.

With known oil separators the filter element is affixed against the housing, or the lid of the filter element is integrated in the lid of housing so to speak, such that when the lid is removed the filter element is also removed with it, which can lead to damage.

Indeed, when removing the lid the person cannot see the filter element and the drainage line. One incorrect movement can lead to irreversible damage, resulting in extra repairs.

Such damage can now be avoided as the lid of the housing can be removed independently of the filter element.

Of course the same also applies when putting back the filter element.

BRIEF DESCRIPTION OF THE DRAWINGS

With the intention of better showing the characteristics of the invention, a few preferred embodiments of an oil separator according to the invention are described hereinafter by way of an example, without any limiting nature, with reference to the accompanying drawings, wherein.

DETAILED DESCRIPTION OF THE INVENTION

Figure 1:
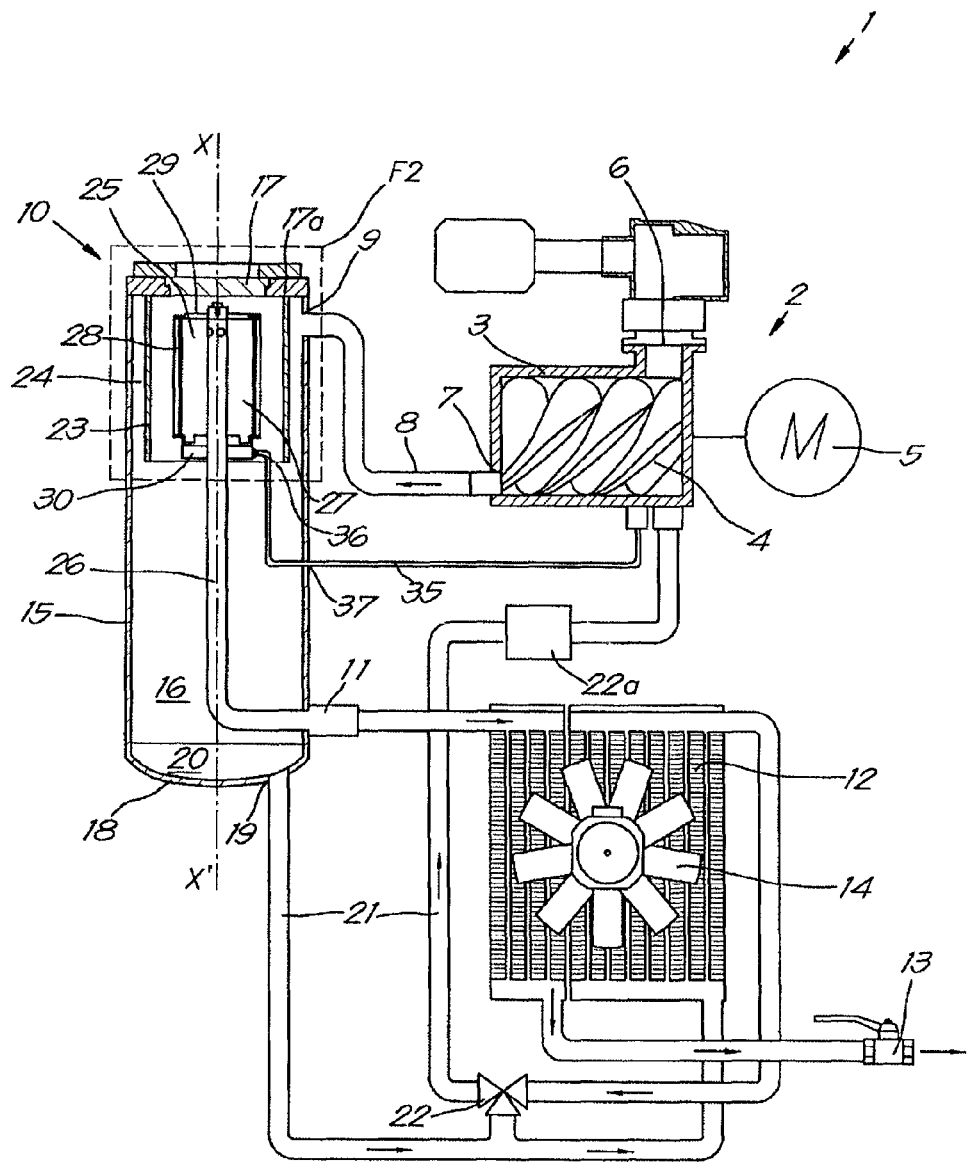
FIG. 1 schematically shows a compressor device with an oil separator according to the invention.

The compressor device 1 shown in FIG. 1 comprises an oil-injected compressor element 2, in this case of the known screw type with a housing 3 in which two meshed helical rotors 4 are driven by a motor 5.

It is clear that the compressor element 2 can also be of another type, such as for example a turbocompressor element, without departing from the scope of the invention.

The housing 3 is provided with an inlet 6 for the supply of gas to be compressed, such as air or another gas or mixture of gases.

The housing 3 is provided with an outlet 7 that is connected to an outlet pipe 8. This outlet pipe 8 is connected to the inlet 9 of an oil separator 10. This inlet 9 is placed tangentially.

The purified gas outlet 11 of the oil separator 10 can be connected directly to a downstream consumer network 13, or via a cooler 12 that will cool the gas before being guided to the consumer network 13 for driving various pneumatic tools or similar that are not shown here.

In this case the cooler 12 is provided with a fan 14 to provide cooling, although it is not excluded that instead of using cooling air for the cooling, a liquid coolant is used that is guided through the cooler by means of a pump.

In this case, but not necessarily, the oil separator 10 is provided with a cylindrical housing 15 that defines a space 16, which in this example is closed off at the top by means of a lid 17. In this case, but not necessarily, the lid 17 is placed on the housing 15 by means of a fixed ring 17a. The fixed ring 17a forms a type of adapter for the lid 17.

In this case the housing 15 has a drain opening 19 on the underside 16 for the removal of separated oil 20 that has been collected at the bottom of the housing.

A pipe 21 extends from this drain opening 19 that carries the oil 20 tack to the compressor element 2, where the oil 20 is injected. Here the pipe 21 passes through the cooler 12 to cool the oil 20.

A three-way valve 22 is provided in the pipe 21 to at least be able to partially bypass the cooler 12, if desired, so that oil 20 can be guided directly to the compressor element 2 without passing along the cooler.

An oil filter 22a is also provided in the pipe 21, downstream from the three-way valve 22.

In the aforementioned space 16 defined by the housing 15, there is a screen 23 in the form of a tube 23, which, in the example shown, but not necessarily, extends from the lid 17 to a distance from the underside 18 of the housing 15. In this case this screen 23 extends in the axial direction X-X' from the housing 15 and such that there is still an open space, hereinafter termed the inlet zone 24, between the tube 23 and the housing 15.

In the screen or the tube 23, i.e. in the space enclosed by the wall of the screen 23, a filter element 25 is affixed and a collector or pipe 26 that connects the interior 27 of the filter element 25 to the aforementioned outlet 11 for purified gas.

The filter element 25 is provided around the collector 26.

Figure 2:
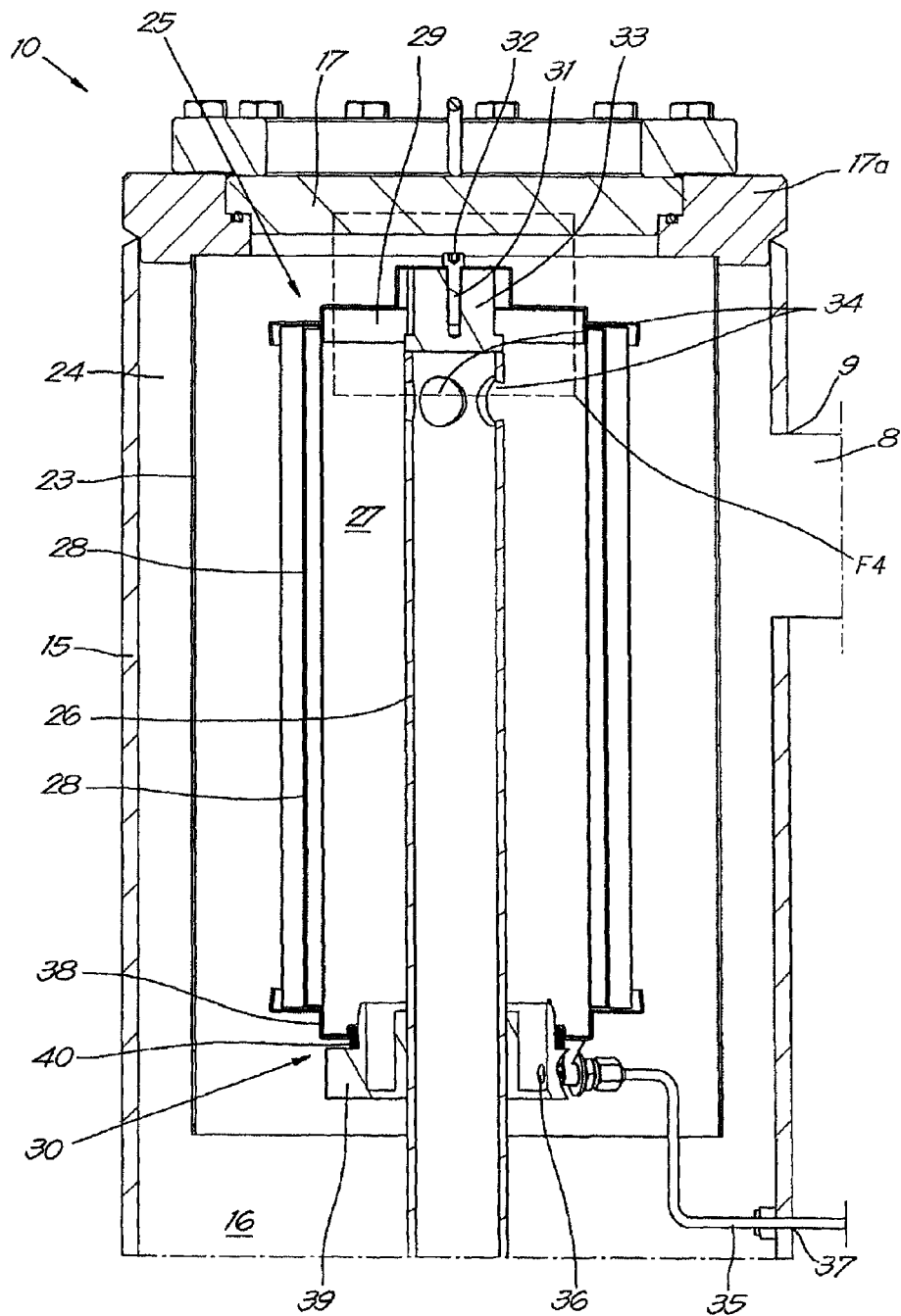
FIG. 2 shows in more detail the section indicated by F2 in FIG. 1.

FIG. 2 shows the filter element 25 in more detail.

In the example shown the axis of the housing 15, the axis of the screen 23 and the axis of the pipe 26 are parallel and coincident, or at least as good as coincident. It is clear that this does not necessarily have to be the case.

The filter element 25 has a casing 28 that is provided with a suitable filter material and which in this example is closed off by a lid 29 and a bottom 30. In this case, the lid 29 of the filter element 25 is preferably at some distance from the lid 17 of the housing 15 of the oil separator 10. It is also possible that the lid 29 of the filter element 25 is against the lid 17 of the housing 15.

But in any case it is preferable that the lid 17 of the housing 15 can be removed independently of the filter element 25.

In this case the aforementioned pipe 26 extends up to the lid 29 on the top of the filter element 25, whereby the pipe 26 is connected to the lid 29 by means of an electrically conductive connecting element 31.

In the example shown the connecting element 31 comprises a bolt 32 that connects the lid 29 of the filter element 25 to a coupling 33 affixed on the pipe 26. This bolt 32 can of course also be a screw, nut or similar.

In this case the sidewall of the pipe 26 is provided with at least one opening 34 for the removal of purified gas, which in this case and preferably is in the vicinity of the lid 29 of the filter element 25.

However, it is also possible that the pipe 26 does not extend to the lid 29 of the filter element 25, but that the open end of the pipe 26 opens out in the interior 27 of the filter element 25.

In this case the pipe 26 extends through the underside of the filter element 25, more specifically through the bottom 30 of the filter element 25, and under the tube 23 through to the outlet 11 for purified gas.

The oil filtered out will arrive at the bottom 30 of the filter element 25.

In order to be able to remove this filtered oil, a drainage line 35 is provided, which according to the invention extends from the underside of the filter element 25, more specifically from an opening 36 in the bottom 30, to an outlet 37 for oil in the housing 15.

In this case the drainage line 35 extends further through the housing 15 and then leads to the compressor element 2, where the removed oil is injected.

Preferably, but not necessarily, the drainage line 35 extends from the aforementioned opening 36 under the screen 23 to the outlet 37 for oil, analogous to the pipe 26.

An advantage of this is that a passage does not have to be provided in the screen 23 for the drainage line 35 or the pipe 26.

An alternative consists of the drainage line 35 extending from the opening 36 through the space between the screen 23 and the filter element 25 up to the fixed ring 17a, The drainage line 35 can be detachably connected to both the opening 36 and the fixed ring 17a. In this case the fixed ring 17a is provided with a channel through which the removed oil can be guided to the outside.

In this example, the drainage line 35 is detachably connected to the underside of the filter element 25 and to the housing 15 of the oil separator 10.

In this case, but not necessarily, the connection between the underside of the filter element 25 and the drainage line 35 comprises two parts, i.e. a first part 38 that is connected to the filter element 25, more specifically the casing 28, and which in this case acts as the bottom 30 and a second part 39 that is connected to the pipe 26 and acts as a support for the filter element 25.

It is clear that the first part 38, and thus the bottom 30, can also form part of the filter element 25.

The two parts 38, 39 fit together such that the interior 27 of the filter element 25 is closed off. In the example shown a sealing ring 40 or similar is provided between the two parts that ensures the airtight closure between the two parts 38, 39. This sealing ring 40 is preferably made of a deformable or elastic material.

The two parts 38, 39 are connected together so that oil collected in the first part 38 can be carried away to the second part 39, whereby the drainage line 35 connects to the opening 36 in the second part 39 of the connection between the drainage line 35 and the underside of the filter element 25.

The aforementioned bolt 32 in the lid 29 of the filter element 25 will be able to ensure that the filter element 25 is pressed against the top of the tube 26 with a certain force or pressure, such that a reliable electrical connection comes into being.

Figure 3:
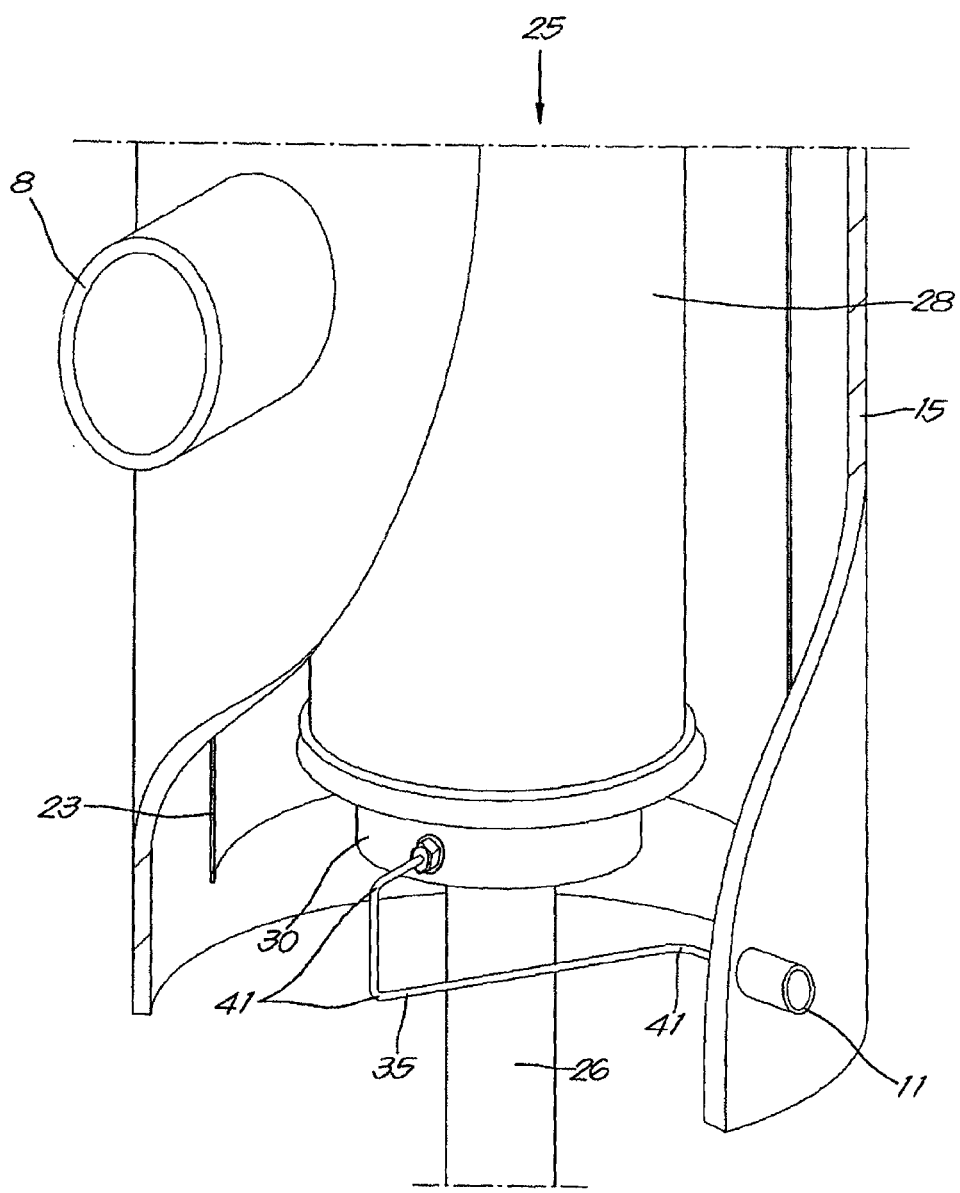
FIG. 3 schematically shows a perspective view of the drainage line of the filter element of FIG. 2, partly cut away.

As is shown in FIG. 3, the drainage line 35 is provided with at least one bend or curve 41, in this case three bends 41.

These bends 41 are in different directions. A consequence of this is that the drainage line 35 does not extend in one plane and has a certain flexibility, even if a drainage line 35 is made of steel or similar.

This flexibility will enable the tolerances of the various components to be accommodated and/or excessive stresses as a result of vibrations to be prevented.

Furthermore the drainage line 35 is affixed in the housing 15 such that the drainage line 35 is visible when the lid 17, and if applicable the filter element 25, is removed.

This will enable the drainage line to be inspected visually.

Moreover the drainage line 35 can also be accessed when the lid 17, and if applicable the filter element 25, is removed so that in the event of any damage the drainage line 35 can be replaced.

The operation of the compressor device 1 is very simple and as follows.

During operation the compressor element 2 will draw in air via the inlet 6 that is then compressed by the helical rotors 4.

Oil will be injected in the compressor element 2 to provide cooling and lubrication for the compressor element 2 and if need be for the closure between the rotors 4 themselves or the rotors 4 and the housing 3 of the compressor element 2.

At the outlet 7 of the compressor element 2, a mixture of compressed gas and oil is transported to the inlet 9 of the oil separator 10.

The oil-gas mixture will arrive in the inlet zone 24 between the housing 15 and the screen 23 via this inlet 9 where the oil-gas mixture will flow through this inlet zone 24 in a downward direction along and around the screen 23.

During this downward movement the mixture lids a distance that is greater than the periphery of the housing 15 of the oil separator 10.

As a result of the centrifugal forces the heavier oil particles end up against the walls of the housing 15, whereby these oil particles then flow downwards along the wall and are collected at the underside 18 of the housing 15.

In this way a first separation phase takes place.

When the mixture is at the bottom of the inlet zone 24, the oil-gas mixture will flow around the end of the tube 23 and then continue in an upward direction.

The mixture thus arrives in the space enclosed by the tube.

Because the oil-gas mixture is forced to make a curve of 160 degrees, the heavier oil particles will continue their downward movement as a result of inertia or thus the force of gravity acting thereon.

In this way a second separation phase takes place, whereby the oil particles are also collected at the underside 18 of the housing 20.

The third and last separation phase takes place by the oil-gas mixture being driven upwards from the space enclosed by the tube 23 through the casing 28 of the filter element 25.

The filter material will filter the remaining oil from the gas so that the oil-gas mixture contains almost 99.99% less oil compared to the unpurified mixture.

The oil filtered out will arrive in the bottom 30 via the filter material.

After flowing through the casing 28 the purified gas arrives in the interior 27 of the filter element 25, where it will leave the oil separator 10 via the opening 34 in the pipe 26 and will be transported through the pipe 26 to the outlet 11 for purified gas and then to the cooler 12.

The purified gas can then be used in an application located downstream.

When the gas flows through the casing 28 and in the interior 27 of the filter element 25, it is possible that the filter element 25 becomes electrostatically charged. The bolt 32 in the lid 29 of the filter element 25 provides an electrically conductive path between the filter element 25 and the pipe 26, whereby the pipe 26 is connected to the housing 15, which in turn is connected to earth. In so doing the accumulation of electrostatic charge in the filter element 25, and the possible accompanying discharge by a spark, is prevented.

The separated oil that is collected on the underside 18 of the oil separator 10 is carried back to the compressor element 2 via the drain opening 19 and the pipe 21, to be injected there again. This pipe 21 passes via the above-mentioned cooler 12 to cool the oil if desired.

Via the three-way valve 22 the quantity of oil that passes via the cooler 12 and the quantity of oil that is guided directly to the compressor element 2 is controlled according to the necessary cooling of the compressor element 2.

The filtered oil collected in the bottom 30 or the first part 38 will then arrive in the second part 39.

The filtered oil will be guided away via the drainage line 35 to be injected back into the compressor element 2.

When the filter material is saturated or when maintenance or repair works are required on the filter element 25, the lid 17 of the oil separator 10 will be opened and removed.

Because the drainage line 35 is not connected to the lid 17 of the oil separator 10, this action will not expose the drainage line 35 to damage.

Then the bolt 32 can be unscrewed and the filter element 25 can be taken out of the oil separator 10.

In this case the second part 39 of the lid 30 is left around the pipe 26.

The new, serviced or repaired filter element 25 can then be fitted, the bolt 32 can be put back and the lid 17 of the oil separator 10 can be reaffixed.

It should be noted here that during these actions the drainage line 35 does not have to be removed and reinstalled, nor is it at risk, and that when replacing the lid 17 there is no need to ensure that the drainage line 35 is correctly fitted or is not damaged.

Because the lid 29 of the filter element 25 is at some distance from the lid 17 of the oil separator 10, the fitting of the lid 17 of the oil separator 10 cannot damage the filter element 25 or move it out of position.

Figure 4:
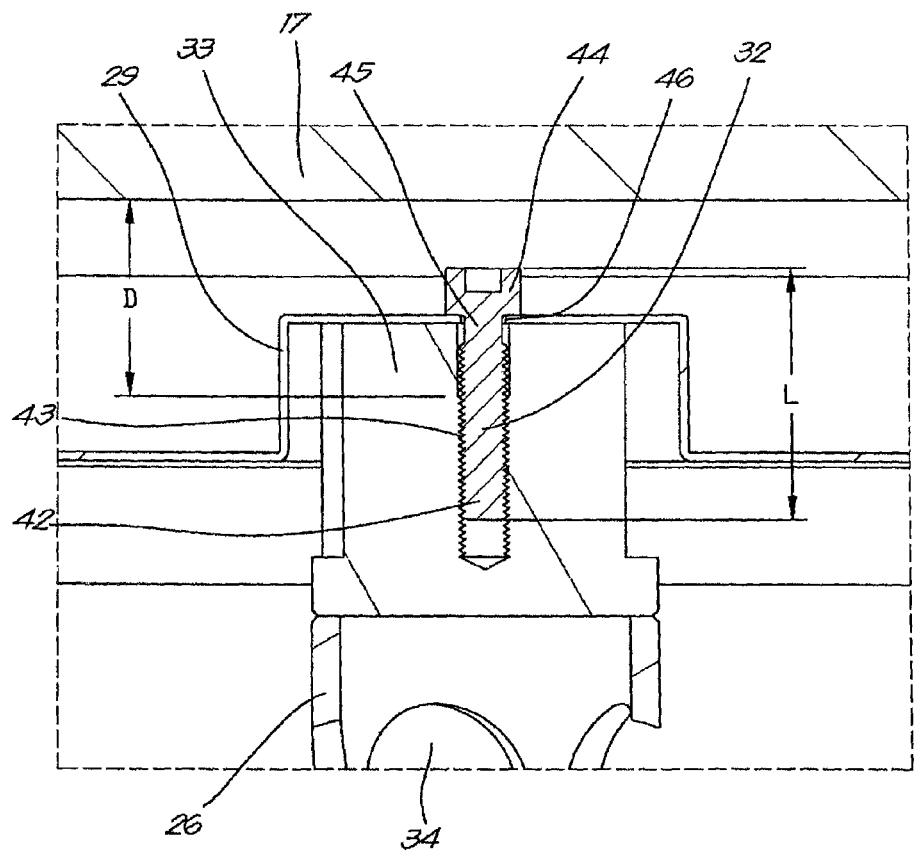
FIG. 4 shows an alternative embodiment of the section indicated by F4 in FIG. 2.

FIG. 4 shows an alternative and preferred embodiment of the bolt 32 in more detail.

The bolt 32 comprises a shaft 42 with a screw thread 43 and a head 44.

The bolt 32 is provided with a narrowing 45 in the shaft 42 that extends from the underside of the head of the bolt 32 to the screw thread.

The length of the narrowing 45 is at least equal to the thickness of the lid 29 of the filter element 25.

Because the narrowing 45 is provided in the bolt 32, a smaller passage 46 can be provided in the lid 29 for the bolt 32 and when the bolt 32 is affixed in the lid it can freely turn in the passage 46 in the lid 29.

Moreover, due to the narrowing 45 and the smaller passage in the lid 29, the bolt 32 cannot just fall out of the lid 29, which prevents the bolt 32 getting lost or falling into the oil separator during assembly.

The area of the cross-section of the bolt 32 at the location of the narrowing 45 is at least, equal to the tension area of the bolt 32. The tension area is the area of the cross-section of the screw thread that can absorb tensile force. By not making the area of the cross-section at the location of the narrowing 45 smaller than the tension area of the screw thread of the bolt 32, the bolt 32 is not weakened. As a result a standard tightening torque can be used to fasten the bolt 32.

In this case the length L of the bolt 32 is greater than the distance p between the start of the screw thread in the coupling 33 and the underside of the lid 17 of the housing 15.

This will ensure that it is not possible to fit the lid 17 when the bolt 32 is not tightly screwed in the coupling 33.

In other words only when it is ensured that the filter element 25 makes an electrical connection to the rest of the oil separator 10 can the lid 17 be placed on the housing 15.

The present invention is by no means limited to the embodiments described as an example and shown in the drawings, but an oil separator according to the invention can be realised in all kinds of forms and dimensions, without departing from the scope of the invention.

The invention claimed is:

1. An oil separator comprising:
a housing with an inlet for an oil-gas mixture and which defines a space that is closed off by means of a lid,
a screen provided in the space, said screen having an open end, wherein an inlet zone for the oil-gas mixture is created between the housing and the screen,
a filter element affixed in an inner space enclosed by the screen,
a pipe or collector that connects an interior of the filter element to an outlet in the housing for purified gas, and
a drainage line configured for removal of oil that has been filtered out by the filter element, wherein the drainage line ensures the removal of the oil that has been filtered out from an underside of the filter element directly to an outlet for oil in the housing,
wherein the oil separator is configured in a way such that a flow of the oil-gas mixture is provided through the inlet to the inlet zone and then flows around the open end of the screen to the inner space enclosed by the screen.

2. The oil separator according to claim 1, wherein the drainage line extends from the underside of the filter element, under the screen to the outlet for oil.

3. The oil separator according to claim 1, wherein the drainage line is detachably connected to the underside of the filter element and/or the housing of the oil separator.

4. The oil separator according to claim 1, wherein the pipe or collector extends from the interior of the filter element through the underside of the filter element and under the screen to the outlet in the housing for purified gas.

5. The oil separator according to claim 1, wherein the lid of the housing can be removed independently of the filter element.

6. The oil separator according to claim 1, wherein the drainage line is provided with at least one curve or bend.

7. The oil separator according to claim 6, wherein the drainage line is provided with a number of bends or curves in different directions.

8. The oil separator according to claim 1, wherein the pipe or collector runs to a lid at the top of the filter element and is connected thereto by means of an electrically conductive connecting element, whereby a sidewall of the pipe or collector is provided with at least one opening for the removal of purified gas.

9. The oil separator according to claim 8, wherein at least one opening is in the vicinity of the lid of the filter element.

10. The oil separator according to claim 8, wherein the electrically conductive connecting element comprises a bolt, screw, nut or similar that connects the lid of the filter element to a coupling affixed on the pipe.

11. The oil separator according to claim 10, wherein the length of the bolt or similar is greater than the distance between the start of the screw thread in the coupling and the underside of the lid of the housing.

12. The oil separator according to claim 10, wherein the bolt, screw, nut or similar is provided with a narrowing in the shaft that extends from the underside of the head of the bolt or similar up to the screw thread over a length that is at least equal to the thickness of the lid of the filter element.

13. The oil separator according to claim 12, wherein the aforementioned narrowing is such that the area of the cross-section of the bolt or similar at the location of the narrowing is at least equal to the tension area of the bolt.

14. An oil separator that is provided with a housing with an inlet for an oil-gas mixture and which defines a space that is closed off by means of a lid, whereby a screen is provided in the space in which a filter element is affixed and a pipe or collector that connects an interior of the filter element to an outlet in the housing for purified gas, whereby the oil separator is provided with a drainage line for removal of oil that has been filtered out, wherein the drainage line ensures the removal of the oil that has been filtered out from an underside of the filter element directly to an outlet for oil in the housing,
wherein the connection between the underside of the filter element and the drainage line comprises a first part that is connected to the filter element or forms part thereof, and a second part that is connected to the pipe or collector and which can act as a support for the filter element, whereby these two parts fit together such that the interior of the filter element is closed, whereby the two parts are connected together such that oil collected in the first part can be transported to the second part, whereby the drainage line is connected to an opening in the second part.

15. The oil separator according to claim 14, wherein a sealing ring or similar is provided between the first part and the second part that ensures the airtight closure between the two parts.

16. The oil separator according to claim 14, wherein the filter element comprises a bottom for collecting the oil filtered out, whereby the bottom is the aforementioned first part.

17. An oil separator that is provided with a housing with an inlet for an oil-gas mixture and which defines a space that is closed off by means of a lid, whereby a screen is provided in the space in which a filter element is affixed and a pipe or collector that connects an interior of the filter element to an outlet in the housing for purified gas, whereby the oil separator is provided with a drainage line for removal of oil that has been filtered out, wherein the drainage line ensures the removal of the oil that has been filtered out from an underside of the filter element directly to an outlet for oil in the housing,
wherein the drainage line is visible when the lid of the housing is removed and/or the drainage line is accessible when the lid, and if applicable the filter element, is removed from the housing.

* * * * *